US007450492B2

(12) United States Patent
Yotsumoto et al.

(10) Patent No.: US 7,450,492 B2
(45) Date of Patent: Nov. 11, 2008

(54) CORRELATION DETECTION APPARATUS AND FOURIER TRANSFORM APPARATUS

(75) Inventors: Koji Yotsumoto, Tokyo (JP); Shunji Abe, Tokyo (JP)

(73) Assignee: Hitachi Kokusai Electric Inc., Tokyo (JP)

( * ) Notice: Subject to any disclaimer, the term of this patent is extended or adjusted under 35 U.S.C. 154(b) by 1017 days.

(21) Appl. No.: 10/463,546

(22) Filed: Jun. 18, 2003

(65) Prior Publication Data

US 2004/0042388 A1 Mar. 4, 2004

(30) Foreign Application Priority Data

Jun. 28, 2002 (JP) ............................ 2002-188848

(51) Int. Cl.
*H04J 11/00* (2006.01)

(52) U.S. Cl. ...................................... 370/210; 370/210

(58) Field of Classification Search ................ 370/503, 370/515, 516, 517, 518, 210, 203; 375/229, 375/354, 343, 340
See application file for complete search history.

(56) References Cited

U.S. PATENT DOCUMENTS 6,111,538 A * 8/2000 Schuchman et al. .... 342/357.12
6,603,822 B2 * 8/2003 Brede et al. ................ 375/340
2002/0037058 A1 * 3/2002 Birru ......................... 375/340
2002/0094044 A1 * 7/2002 Kolze et al. ................ 375/346
2005/0031061 A1 * 2/2005 Ojard et al. ................ 375/346
2005/0207334 A1 * 9/2005 Hadad ....................... 370/203
2007/0121718 A1 * 5/2007 Wang et al. ................ 375/233

FOREIGN PATENT DOCUMENTS

| | | | |
|---|---|---|---|
| JP | A 2000-48008 | | 2/2000 |
| JP | A 2000-231552 | | 8/2000 |
| JP | A-2001-313589 | | 11/2001 |
| JP | A 2002-32357 | | 1/2002 |
| JP | A 2002-32359 | | 1/2002 |
| JP | A 2002-542529 | | 12/2002 |
| WO | WO 02/13476 | * | 2/2002 |

* cited by examiner

*Primary Examiner*—Ajit Patel
(74) *Attorney, Agent, or Firm*—Oliff & Berridge PLC

(57) ABSTRACT

A correlation detection apparatus which realizes software CDMA inverse-spread processing. A reception circuit receives an RACH preamble from a mobile station, and an A/D converts the preamble into digital received data. An FFT unit FFT-processes the received data to obtain an FFT result. An RACH code storage unit holds an RACH preamble code, and another FFT unit FFT-processes the RACH preamble code to obtain another FFT result. A multiplication unit multiples the FFT result by the other FFT result. An IFFT unit IFFT-processes a result of multiplication input from the multiplication unit to obtain a delay profile. A data decoding unit decodes the received data by using the delay profile, and obtains decoded data.

2 Claims, 12 Drawing Sheets

MOBILE COMMUNICATION SYSTEM 1

[FIG. 1]
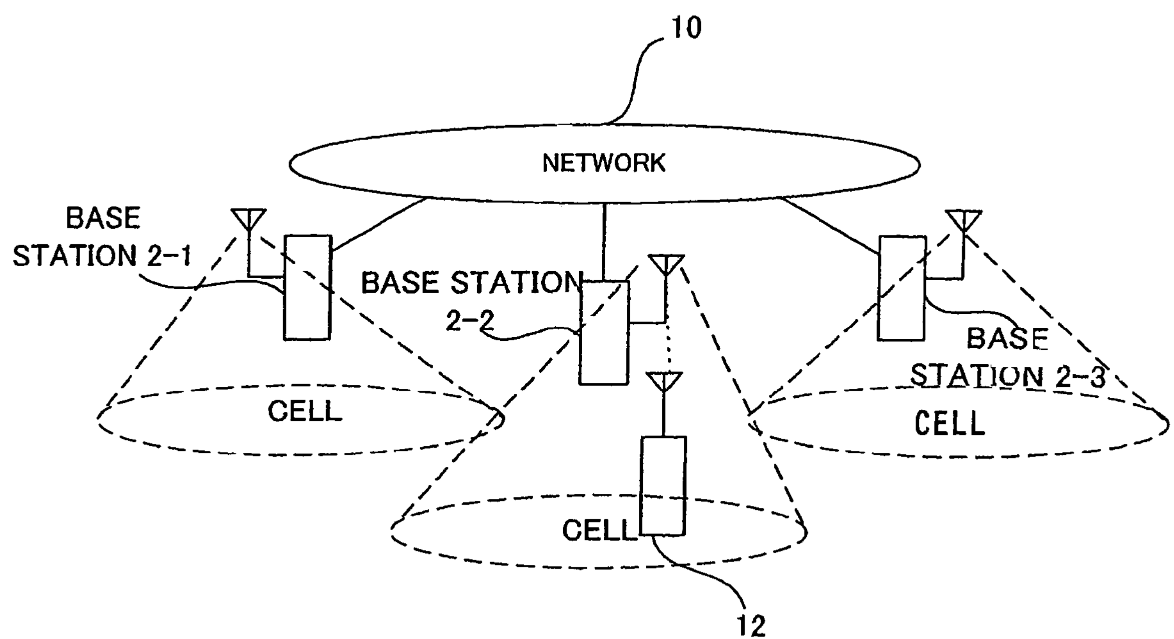

[FIG. 2]
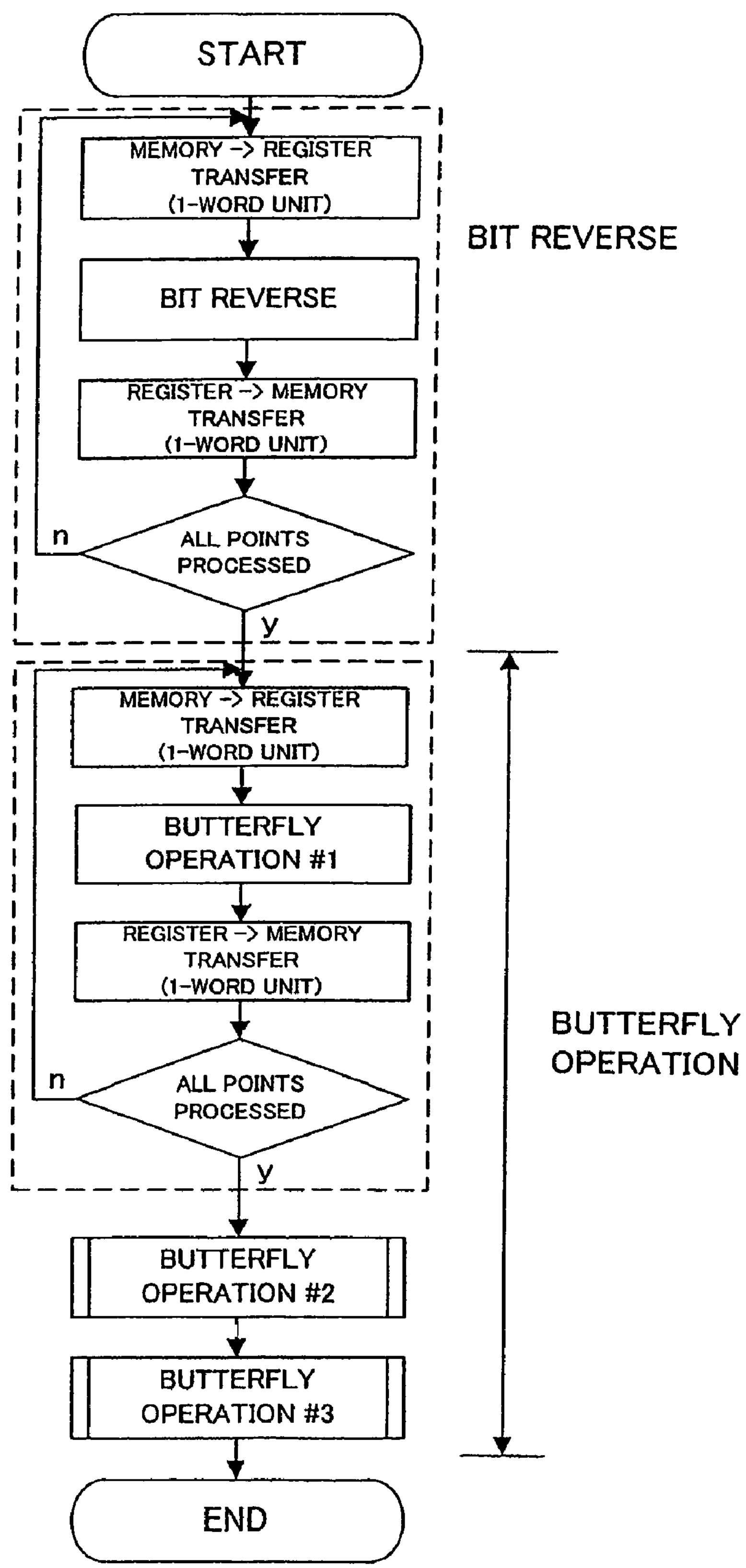

[FIG. 3]
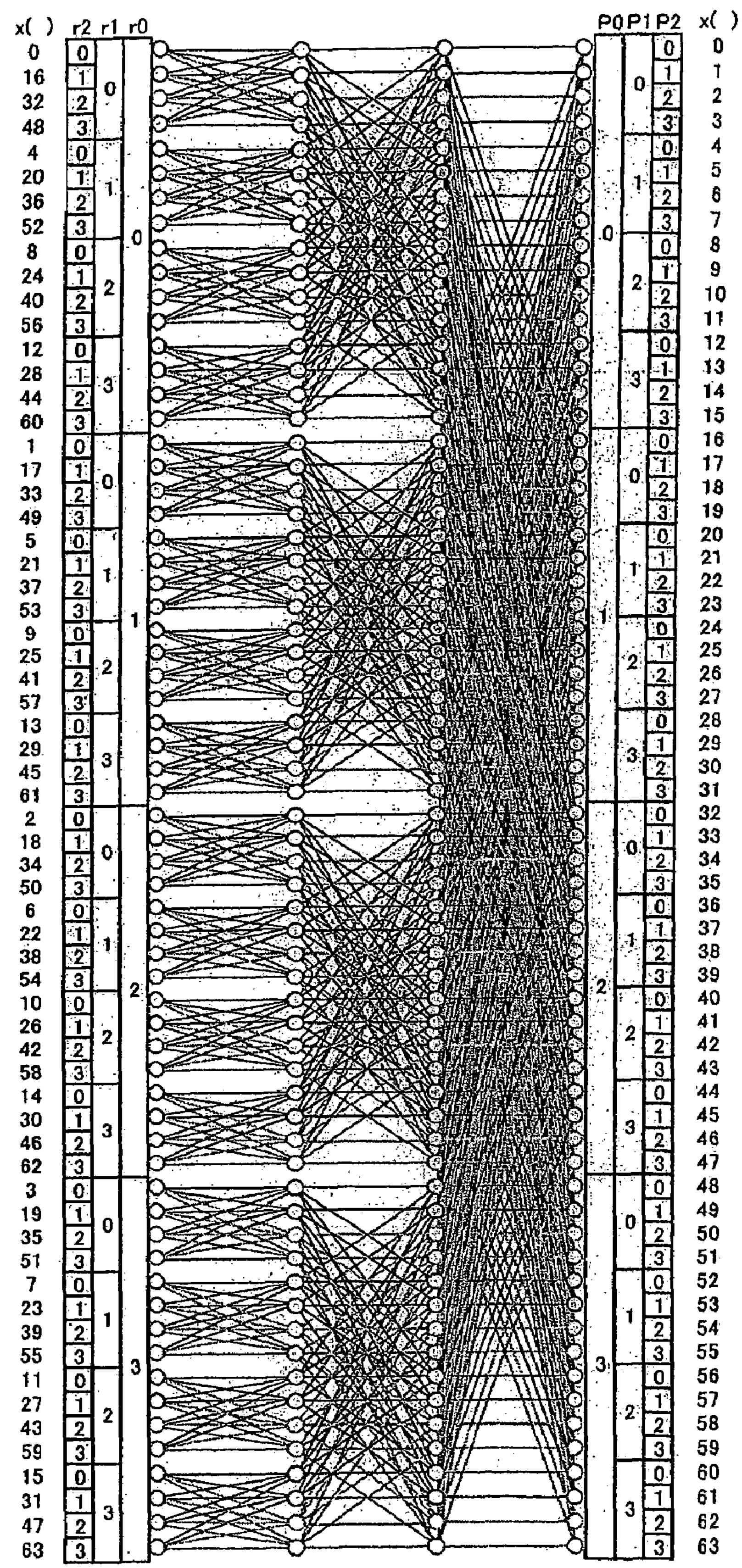

[FIG. 4]

DFT IS DIVIDED INTO EQUAL 4 PARTS AS FOLLOWS $$X_k = \Sigma_{n=0}^{N-1} ?_n W_N^{nk} = \Sigma_{r0=0}^{3} \Sigma_{n=0}^{N/4-1} ?(4n+r0)\, W_N^{(4n+r0)k} = \Sigma_{r0=0}^{3} W_N^{r0k} \Sigma_{n=0}^{N/4-1} ?(4n+r0)\, W_{N/4}^{nk}$$

IF K = K0 + N/4*p0 HOLDS, $$\begin{cases} X(k0+N/4 \cdot p0) = \Sigma_{r0=0}^{3} (-j)^{p0r0} W_N^{r0k0}\, x1(k0) \\ x1(k0) = \Sigma_{n=0}^{N/4-1} ?(4n+r0)\, W_{N/4}^{nk} \end{cases} \qquad \begin{cases} k0 = 0,1,2,\cdots,N/4-1 \\ p0 = 0,1,2,3 \end{cases}$$

SIMILARLY, REGARDING X1, $$\begin{cases} x1(k1+N/4^2 \cdot p1) = \Sigma_{r1=0}^{3} (-j)^{p1r1} W_{N/4}^{r1k1}\, x2(k1) \\ x2(k1) = \Sigma_{n=0}^{N/(4*2)-1} ?(4^2n+4r1+r0)\, W_{N/(4*2)}^{nk1} \end{cases} \qquad \begin{cases} k1 = 0,1,2,\cdots,N/4^2-1 \\ p1 = 0,1,2,3 \end{cases}$$

ここで、Σ及びWのルビ（4*2）は$4^2$を表わす。以下同様。

SIMILARLY, REGARDING X2, $$\begin{cases} x2(k2+N/4^3 \cdot p2) = \Sigma_{r2=0}^{3} (-j)^{p2r2} W_{N/(4*2)}^{r2k2}\, x3(k2) \\ x3(k2) = \Sigma_{n=0}^{N/(4*3)-1} ?(4^3n+4^2r2+4r1+r0)\, W_{N/(4*3)}^{nk2} \end{cases} \qquad \begin{cases} k2 = 0,1,2,\cdots,N/4^2-1 \\ p2 = 0,1,2,3 \end{cases}$$

FURTHER, DECOMPOSITION IS COUTINUED UNTIL MINIMUM 4 ARE OBTAINED.
ASSUMING THAT N = 4m+1 HOLDS, AND [ ]4 MEANS QUATERNARY REPRESENTATION, $$X(k0+N/4 \cdot p0) = \Sigma_{r0=0}^{3} (-j)^{p0r0} W_N^{r0k0}\, x1(k0) \qquad k0 = 0,1,2,\cdots,N/4-1$$

$$x1(k1+N/4^2 \cdot p1) = \Sigma_{r1=0}^{3} (-j)^{p1r1} W_{N/4}^{r1k1}\, x2(k1) \qquad k1 = 0,1,2,\cdots,N/4^2-1$$

$$x2(k2+N/4^3 \cdot p2) = \Sigma_{r2=0}^{3} (-j)^{p2r2} W_{N/(4*2)}^{r2k2}\, x3(k2) \qquad k2 = 0,1,2,\cdots,N/4^2-1$$

$$\vdots$$

$$x_t(k_t+N/4^{t+1} \cdot p_t) = \Sigma_{rt=0}^{3} (-j)^{ptrt} W_{N/(4*t)}^{rtkt}\, x_{t+1}(k_t) \qquad k_t = 0,1,2,\cdots,N/4^t-1$$

$$\vdots$$

$$x_m(p_m) = \Sigma_{rm=0}^{3} (-j)^{pmrm}\, ?[r_m r_{m-1} \cdots r2r1r0]_4 \qquad k_m = 0$$

IN SUMMARY, IT CAN BE WRITTEN $$X[p0p1p2\cdots p_m]_4 = \Sigma_{r0=0}^{3} (-j)^{p0r0} W_N^{r0k0}\, \Sigma_{r1=0}^{3} (-j)^{p1r1} W_{N/4}^{r1k1} \Sigma_{r2=0}^{3} (-j)^{p2r2} W_{N/(4*2)}^{r2k2} \cdots \times \Sigma_{rt=0}^{3} (-j)^{ptrt} W_{N/(4*t)}^{rtkt} \cdots \times \Sigma_{rm=0}^{3} (-j)^{pmrm}\, ?[r_m r_{m-1} \cdots r2r1r0]_4$$

$$\begin{cases} k0 = [p1p2\cdots p_t \cdots p_m]_4 \\ k1 = [p2p3\cdots p_m]_4 \\ k2 = [p3p4\cdots p_m]_4 \\ \vdots \\ k_{m-1} = [p_m]_4 \\ k_m = 0 \end{cases}$$

[FIG. 5]
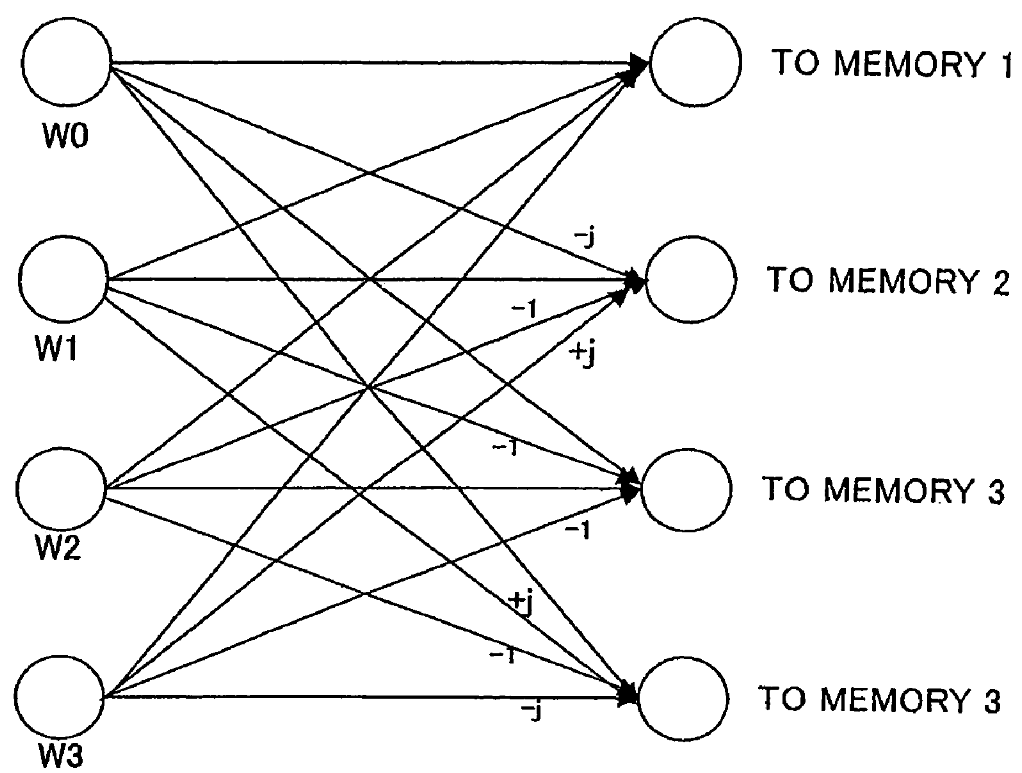

[FIG. 6]
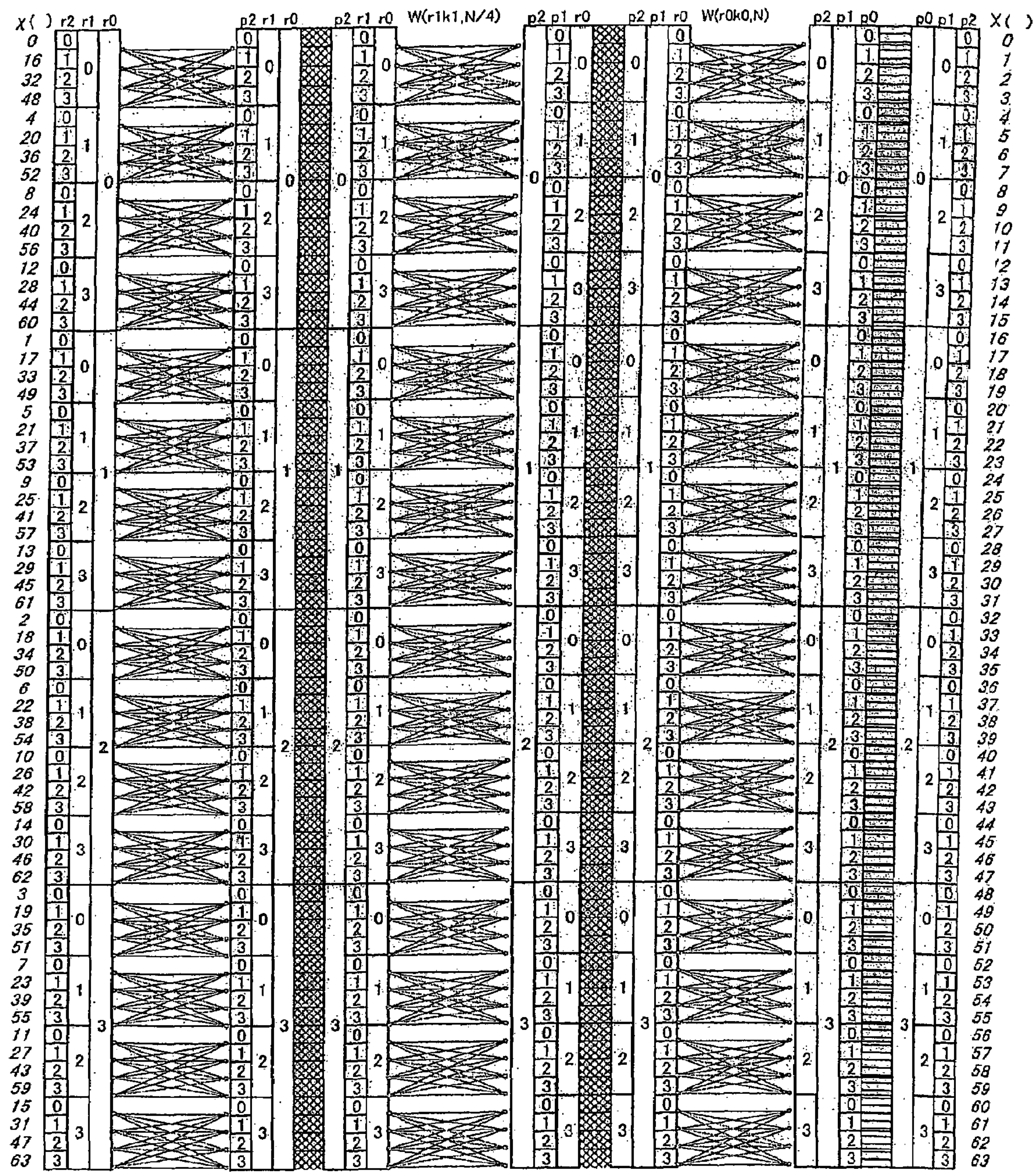

[FIG. 7]
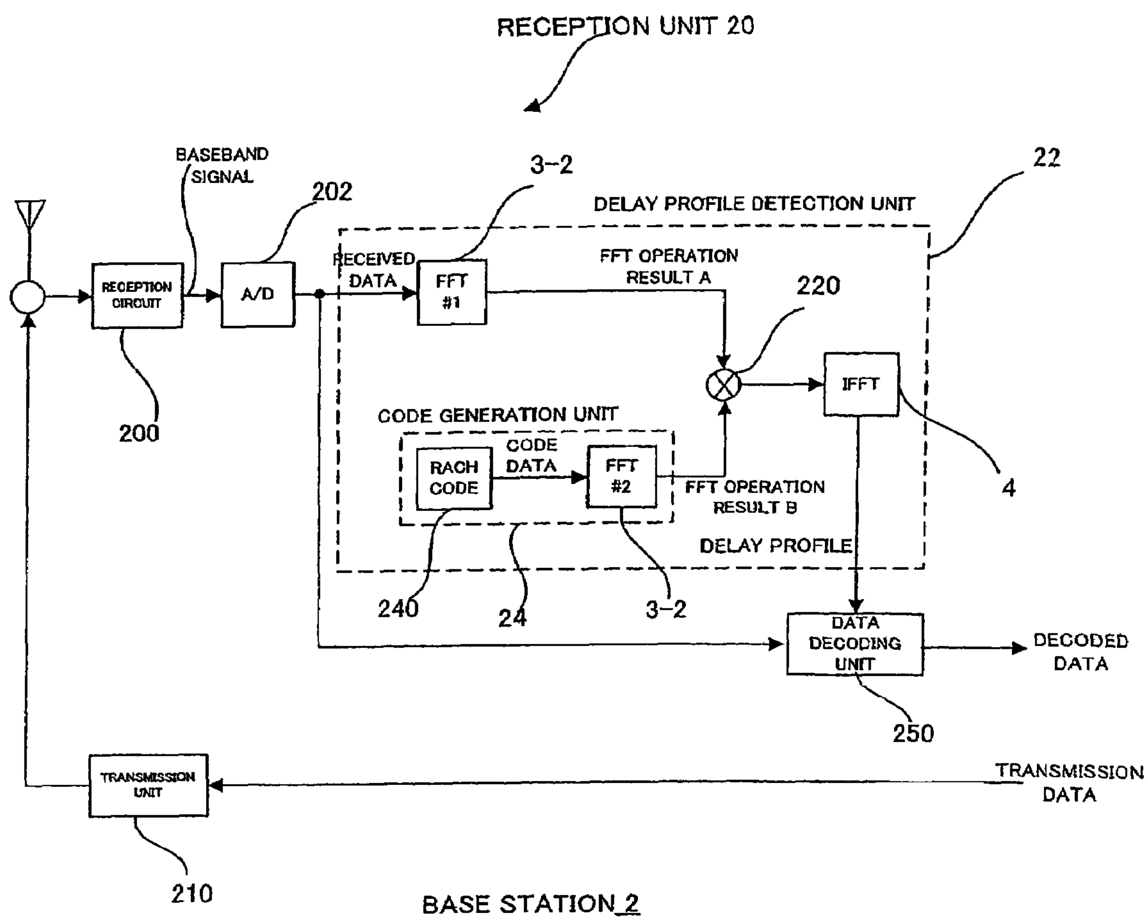

[FIG. 8]
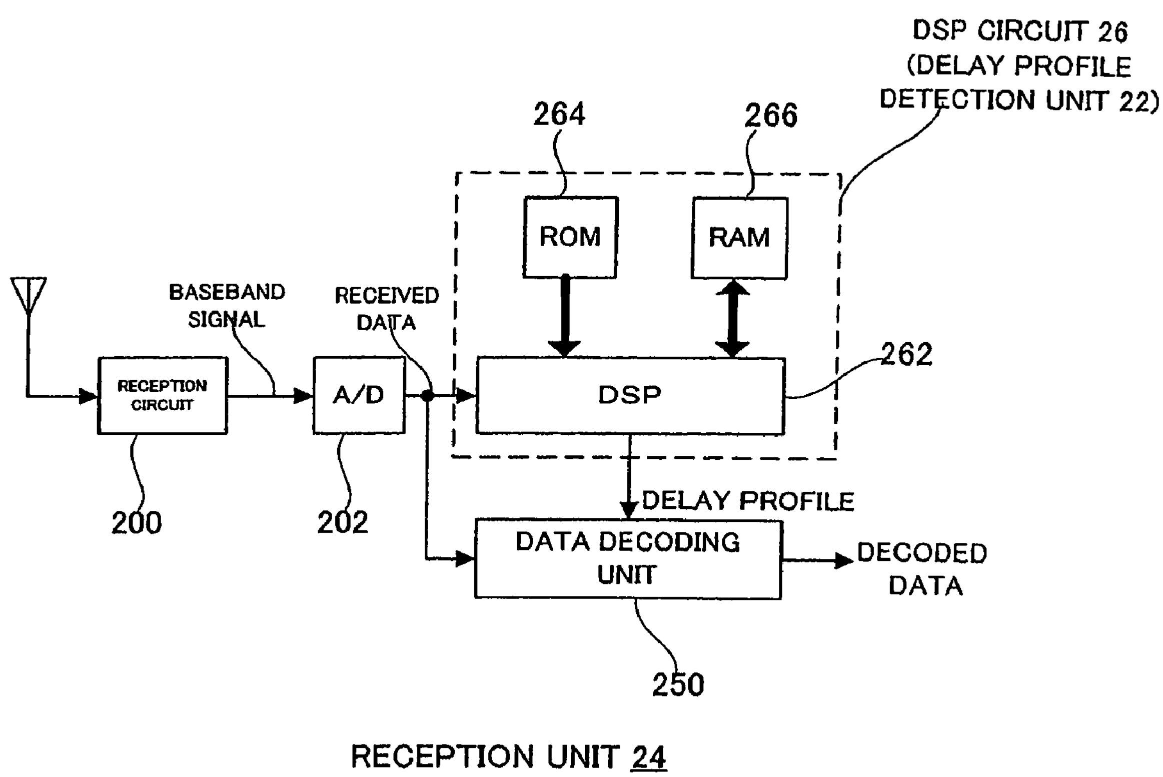

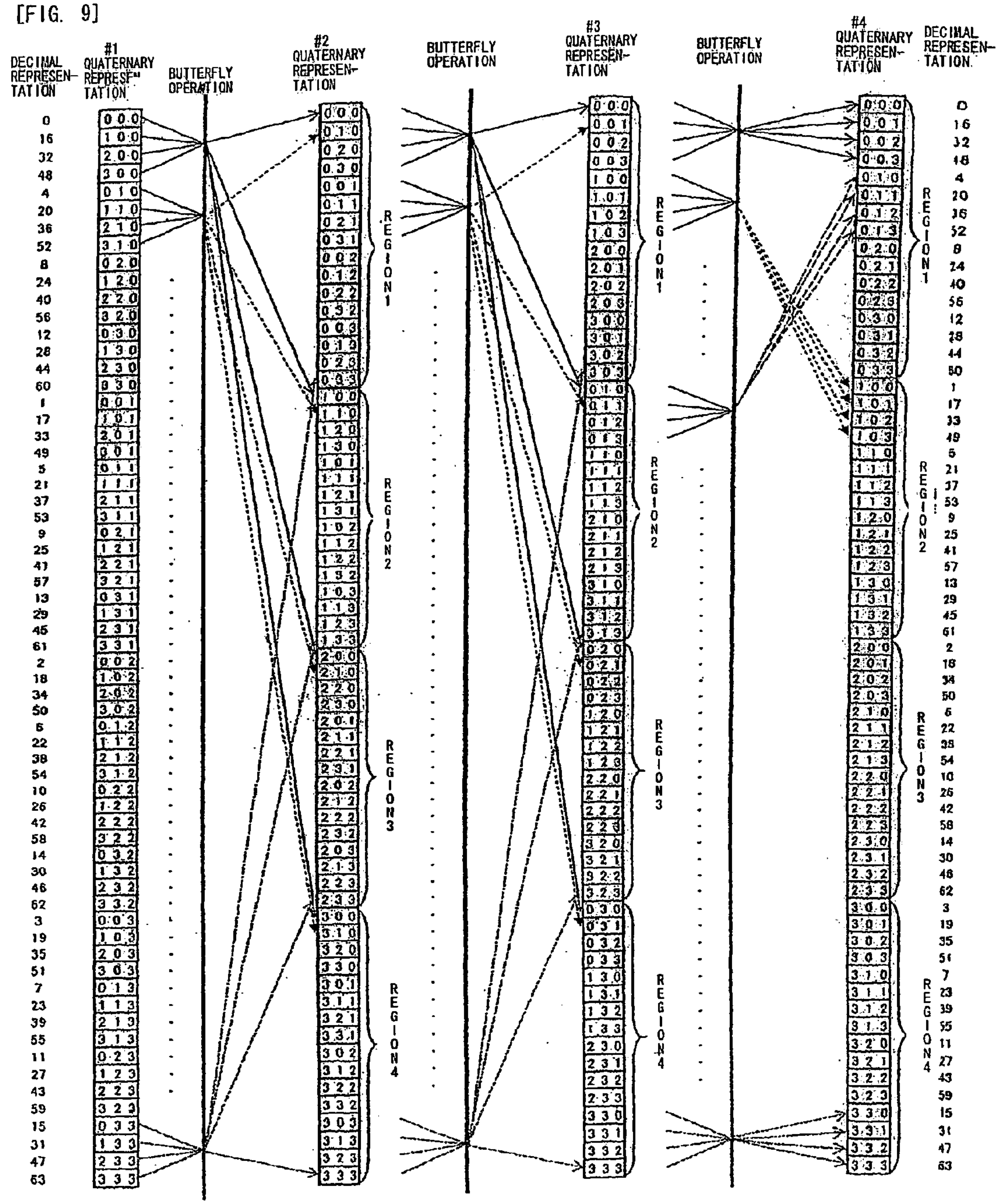
[FIG. 9]
DECIMAL REPRESENTATION
1 QUATERNARY REPRESENTATION
BUTTERFLY OPERATION
2 QUATERNARY REPRESENTATION
BUTTERFLY OPERATION
3 QUATERNARY REPRESENTATION
BUTTERFLY OPERATION
4 QUATERNARY REPRESENTATION
DECIMAL REPRESENTATION
REGION1
REGION2
REGION3
REGION4

[FIG. 10]
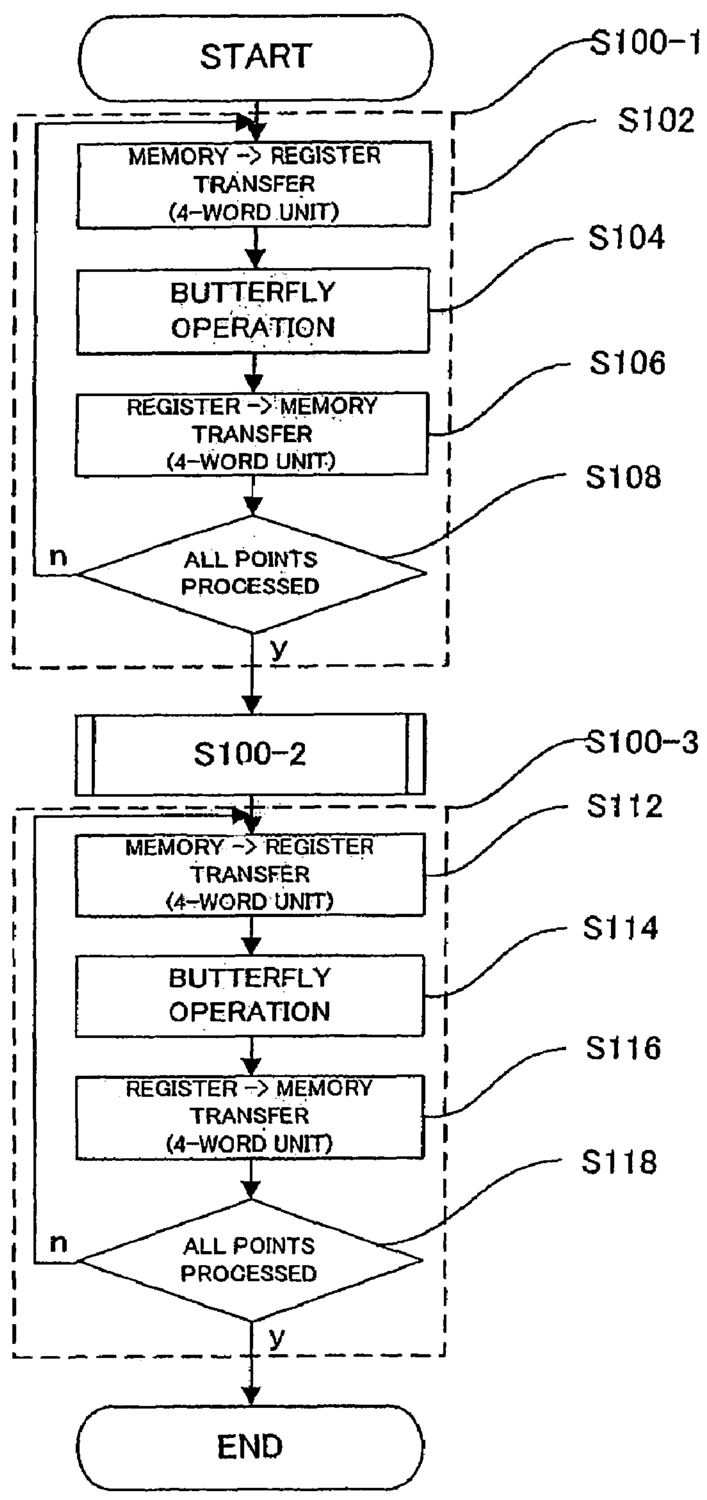
S10

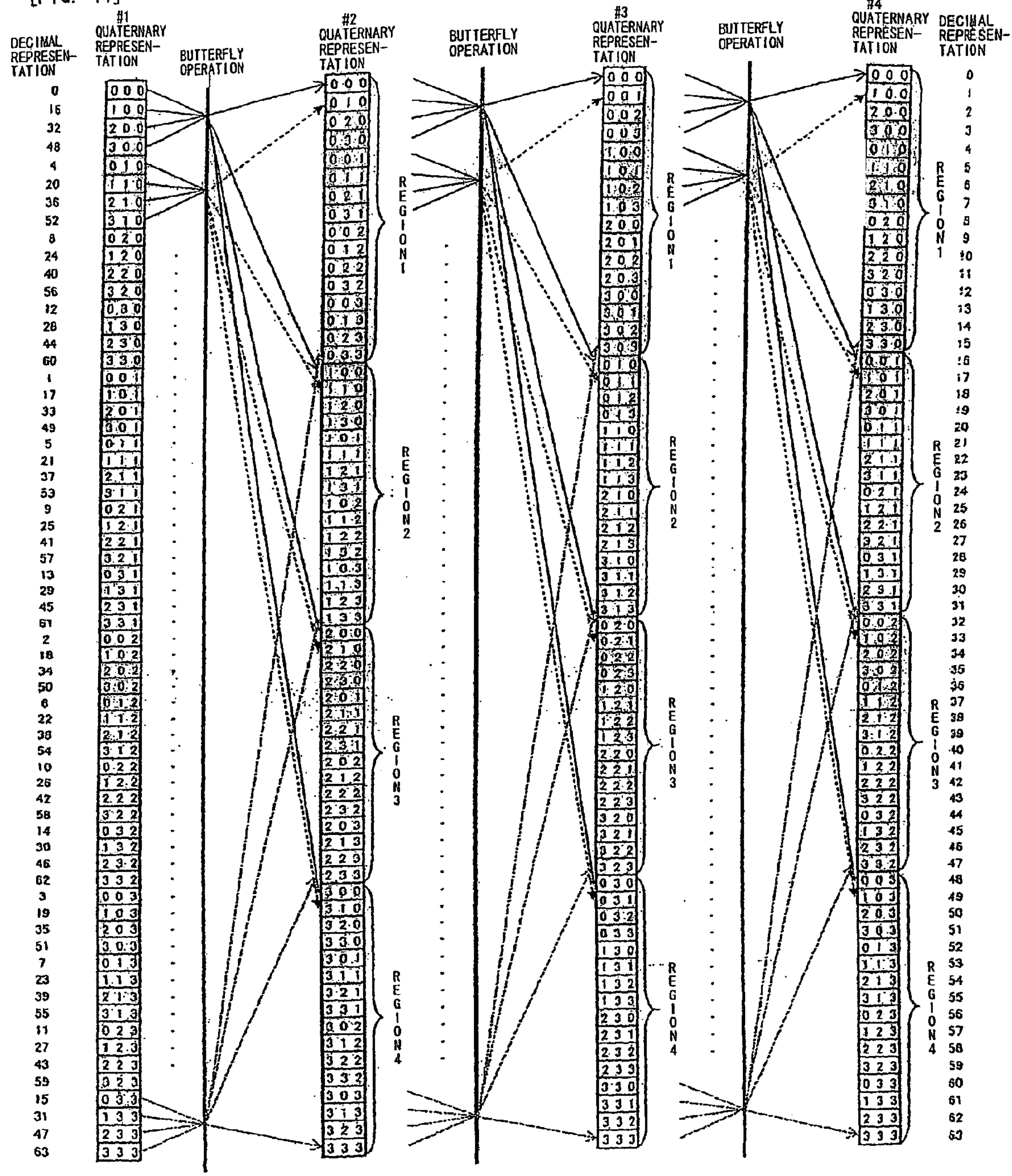
[FIG. 11]
DECIMAL REPRESENTATION
1 QUATERNARY REPRESENTATION
BUTTERFLY OPERATION
2 QUATERNARY REPRESENTATION
BUTTERFLY OPERATION
3 QUATERNARY REPRESENTATION
BUTTERFLY OPERATION
4 QUATERNARY REPRESENTATION
DECIMAL REPRESENTATION
REGION1
REGION2
REGION3
REGION4

[FIG. 12]
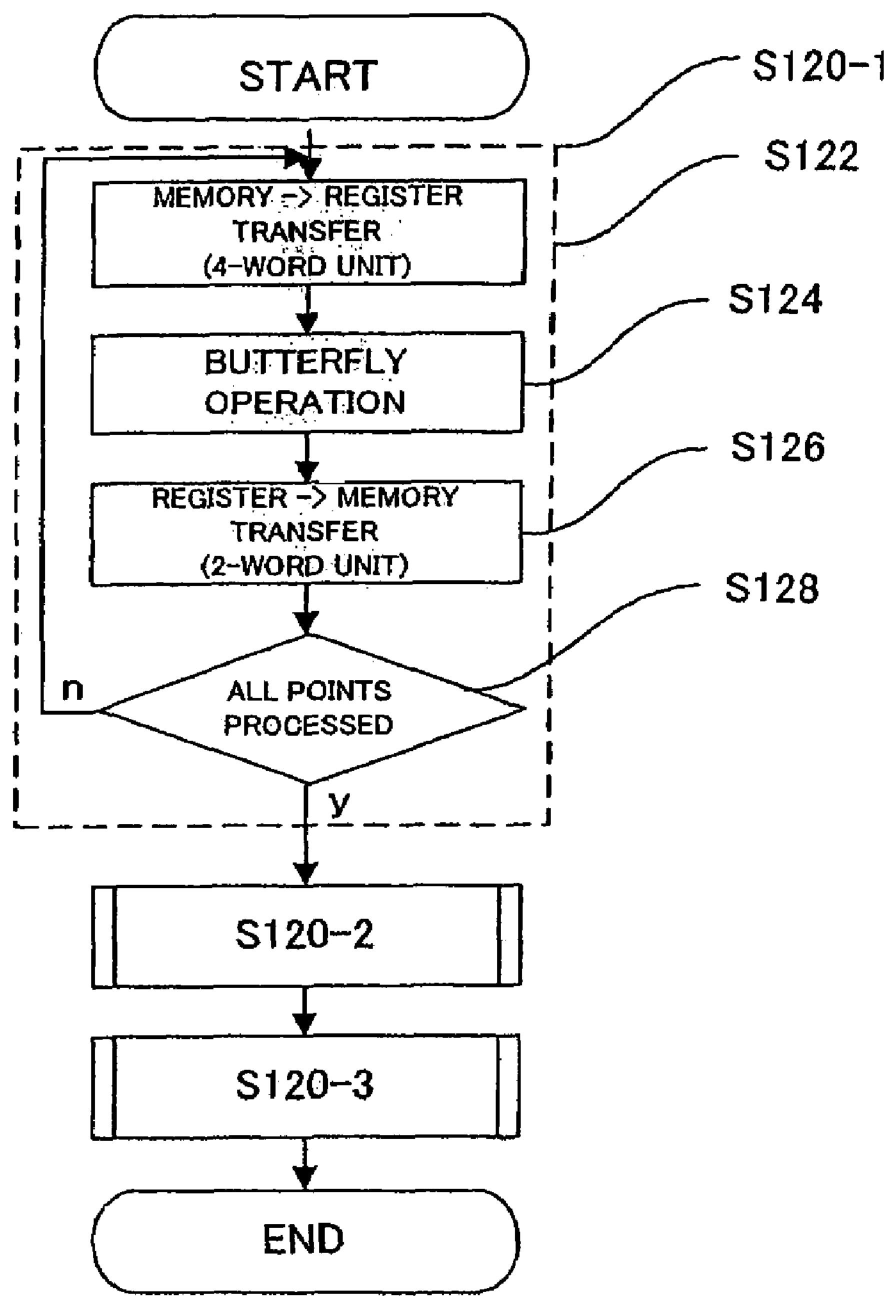
S12

CORRELATION DETECTION APPARATUS AND FOURIER TRANSFORM APPARATUS

BACKGROUND OF THE INVENTION

1. Field of the Invention

The present invention relates to a correlation detection apparatus for detecting a correlation between received data and code for synchronous capture/tracking in a CDMA communication system or the like, and a Fourier transform apparatus appropriate to the correlation detection apparatus.

2. Description of the Related Art

For synchronous capture/tracking of communication between a base station and a mobile station in a W-CDMA communication system, inverse-spread processing (correlation detection processing) for obtaining correlation between a spread received signal and code is required, and for this processing a matched filter is employed.

In a case where a preamble (RACH preamble) of a random access channel (RACH) is detected by using a matched filter, as the number of taps is large due to delay of signal transmission between the base station and the mobile station, the circuit scale of the matched filter is also very large.

Accordingly, it is difficult to perform the detection of the RACH preamble only by hardware processing.

On the other hand, the RACH preamble may be detected by software inverse-spread processing using a DSP.

In the software inverse-spread processing, development costs of the base station and mobile station can be reduced and high-level functions can be attained.

However, as a very large amount of operations is required for detection of RACH preamble by using the DSP, conventionally the software inverse-spread processing has not been realized without difficulty.

SUMMARY OF THE INVENTION

The present invention has been made in consideration of the above situation, and has its object to provide a correlation detection apparatus which realizes CDMA software inverse-spread processing and a Fourier transform apparatus used in the correlation detection apparatus.

[Correlation Detection Apparatus]

According to the present invention, the foregoing object is attained by providing a correlation detection apparatus for detecting a first signal in a time domain including predetermined code, and a correlation between the first signal and the predetermined code, comprising:

transform means for transforming the first signal in the time domain into a frequency domain;

correlation-signal generation means for generating a correlation signal indicating a correlation between the predetermined code transformed to the frequency domain and the first signal transformed to the frequency domain; and correlation detection means for inverse-transforming the generated correlation signal into a signal in the time domain and detecting the correlation between the first signal and the predetermined code.

Preferably, the transform means transforms the first signal into the frequency domain by performing Fourier transform processing on the first signal in the time domain, the correlation-signal generation means generates the correlation signal by multiplying the predetermined code transformed to the frequency domain by the first signal transformed to the frequency domain, and the correlation detection means detects the correlation between the first signal and the predetermined code by performing inverse Fourier transformation on the generated correlation signal.

[Fourier Transform Apparatus]

Further, the Fourier transform apparatus according to the present invention is a Fourier transform apparatus for performing Fourier transform by performing an N-stage butterfly operation on $M^N$ time-series data by using $M^N$ (M is a radix in Fourier transform; N=1, 2, . . . ) continuous storage regions, comprising: data storage means for storing (I; I=0,1, . . . , $M^N-1$)th data into ($M^{N-1}$ ([I/M°]modM)+$M^{N-2}$([I/$M^1$] modM)+ . . . +M°([I/$M^{N-1}$]modM); [X] is an integer not exceeding X; YmodZ is a residue system of integer Y for integer Z)th storage region; first butterfly-operation processing means for repeating processing of storing respective (MJ+H)th M pieces of data, obtained by performing a (J)th butterfly operation on data stored in (MJ+H; J=0, 1, . . . , $M^{N-1}-1$, H=0 to M−1)th M storage regions, into ($M^{N-1}$H+$M^{N-2}$ ([J/$M^1$]modM)+ . . . +M°([J/$M^{N-1}$]modM))th M storage regions, (N−1) times; and second butterfly-operation processing means for performing processing of storing respective (MJ+H)th M pieces of data, obtained by performing a butterfly operation on the data obtained as a result of the (N−1)th butterfly operation and stored in the (MJ+H)th M storage regions, into ($M^{N-1}$([J/$M^1$]modM)+ . . . +sM°([J/$M^{N-1}$] modM)+H)th M storage regions.

[Inverse Fourier Transform Apparatus]

Further, the inverse Fourier transform apparatus according to the present invention is an inverse Fourier transform apparatus for performing inverse Fourier transform by performing an N-stage butterfly operation on $M^N$ time-series data by using $M^N$ (M is a radix in inverse Fourier transform; N=1, 2, . . . ) continuous storage regions, comprising: third butterfly-operation processing means for repeating processing of storing respective (MJ+H)th M pieces of data, obtained by performing a (J)th butterfly operation on data stored in (MJ+H; J=0, 1, . . . , $M^{N-1}-1$, H=0, 1, . . . , M−1)th M storage regions, into ($M^{N-1}$H+$M^{N-2}$([J/$M^1$]modM) + . . . +Mo([J/$M^{N-1}$]modM))th M storage regions, (N) times.

BRIEF DESCRIPTION OF THE DRAWINGS

FIG. 1 is a schematic diagram showing a W-CDMA mobile communication system;

FIG. 2 is a flowchart showing general FFT-processing;

FIG. 3 is an explanatory diagram showing the transition of data arrangement in the general FFT-processing;

FIG. 4 is an example of FFT-processing according to the present invention;

FIG. 5 is an explanatory diagram showing a butterfly operation with a radix of 4;

FIG. 6 is an explanatory diagram showing the transition of data arrangement in the FFT-processing according to the present invention;

FIG. 7 is a block diagram showing hardware and a hardware construction of a base station in FIG. 1;

FIG. 8 is a block diagram showing a hardware construction of a reception unit in FIG. 7;

FIG. 9 is an explanatory diagram showing transition of data arrangement in processing by a first FFT unit in FIG. 7;

FIG. 10 is a flowchart showing first to third (final) stages of butterfly operation processing (S10) by the first FFT unit in FIG. 7;

FIG. 11 is an explanatory diagram showing the transition of data arrangement in the processing by a first IFFT unit in FIG. 7; and FIG. 12 is a flowchart showing the first to third (final) stages of butterfly operation processing by the first IFFT unit in FIG. 7.

DETAILED DESCRIPTION OF THE PREFERRED EMBODIMENT

Prior to explanation of an embodiment of the present invention, the background against which the present invention has been made will be described for deeper understanding of the invention.

FIG. 1 is a schematic diagram showing a W-CDMA mobile communication system 1.

As described above, in the W-CDMA mobile communication system 1 as shown in FIG. 1, to perform inverse-spread processing (correlation detection processing) on a spread-processed signal, a hardware matched filter, a sliding correlator or the like has been conventionally employed.

In the mobile communication system 1, since the radius of cells covered by respective base stations 2-1 to 2-3 connected via a network 10 is not necessarily fixed, a spread signal transmitted between the base stations 2-1 to 2-3 and a mobile station 12 is delayed differently in correspondence with respective radii of the cells.

In a case where the number of taps is increased to absorb such delay difference, the circuit scale of the matched filter becomes very large.

For example, in the base stations 2-1 to 2-3 where a spread gain greater than that in the mobile station 12 is required, to obtain 1024 chips spread gain by using the matched filter, as a signal over-sampled 4 times per chip is processed, the number of taps is 4096.

Further, for example, in a case where the cell radius is 50 km, a round-trip transmission distance between the base station 2 and the mobile station 12 is a maximum of 100 km, and the signal is delayed by 2560 chips (about 666 μs) in the 100-km transmission.

If the delayed W-CDMA signal is inverse spread by using the matched filter, the number of taps is 14336 (=(2560+1024)×4(4 is over-sampling)).

In this manner, currently it is very difficult to realize a hardware matched filter including a large number of taps.

On the other hand, for example, a software matched filter by using a DSP or the like is difficult due to the very large amount of operations.

The present invention enables software inverse-spread processing (correlation detection processing) by using a DSP or the like, and enables a "soft radio" base station 2, by reducing the operation amount by performing fast Fourier transform (FFT) and inverse fast Fourier transform (IFFT) in place of software matched filter operation.

Further, the present invention reduces time necessary for the inverse-spread processing, and easily realizes software inverse-spread processing by faster FFT/IFFT and optimization of FFT/IFFT size in correspondence with cell radius.

[Inverse-Spread Processing Using FFT]

First, the inverse-spread processing by FFT/IFFT will be described.

The inverse-spread processing by using a matched filter is represented by the following expression 1.

Note that in expression 1, n means a chip or sample; m, a timing difference between received data and code; $y_m$, the result of inverse spread; $X_n$, received data; and $\gamma_{n+m}$, the number of conjugation of the spread code.

$$y_m=\Sigma\, \chi_n\gamma_{n+m} \quad \text{(Expression 1)}$$

Σ: total sum when $n=0$ to $N-1$ holds

On the other hand, assuming that $Y_k$, $X_k$ and $V_k$ are values obtained by FFT-processing of the values $Y_n$, $\chi_n$ and $\gamma_n$, the convolution operation in the FFT-processing is a simple multiplication as shown in the following expression 2.

Note that expression 2 is generalized from expression 1. In the expression 2, n and k do not mean any particular value.

$$Y_k=X_k\times V_k \quad \text{(Expression 2)}$$

The value $Y_k$ in the expression 2 is IFFT-processed, and thereby the value $y_m$ in the expression 1 can be obtained.

If a received signal is inverse-spread processed and electrified, and plotted on a time axis, a delay profile is obtained.

Note that the above-described "electrification" means obtaining I and Q signals, having phases 90° different from each other, from a signal detected as a voltage, and obtaining $I^2+Q^2$ at the level of electricity.

In the W-CDMA system, RAKE synthesis is performed for efficiently utilizing a delayed signal wave, and for the RAKE synthesizing the delay profile obtained from a preamble (e.g., random access channel (RACH) preamble (RACH preamble)) is employed.

As described above, to obtain the delay profile by inverse-spread processing the RACH preamble, the result of FFT obtained by FFT-processing the RACH received signal is multiplied by the result of FFT obtained by FFT-processing the RACH preamble code, and the result of multiplication is IFFT-processed.

In this manner, the amount of operations in the inverse-spread processing can be reduced to between a several-tenth part and a several-hundredth part (the value differs in accordance with the number of taps or the like) by replacing the matched filter with the FFT/IFFT, and software inverse-spread processing using a DSP can thus be realized.

In the following description, the detection of RACH preamble in a W-CDMA system will be given as a specific example.

[Faster FFT/IFFT]

As described above, software inverse-spread processing can be realized by using the FFT/IFFT-processing.

However, if faster FFT/IFFT-processing can be realized, necessary performance of the hardware can be reduced, and the system configuration can be flexible.

In the following example, an approach for achieving faster FFT/IFFT in the present invention will be described.

FIG. 2 is a flowchart showing general FFT-processing.

FIG. 3 is an explanatory diagram showing transition of data arrangement in the general FFT-processing.

The radix of FFT-processing of the present invention is not limited to 4 and the number of stages is not limited to 3. However, for simplification and concretization of illustration and explanation, the radix is 4 and the number of stages of butterfly operation is 3 in the FFT/IFFT-processing in the following description.

As shown in FIG. 2, in general FFT-processing, first, bit reverse processing is performed to rearrange time-domain input data as the subject of processing.

A 3-stage butterfly operation is performed on the rearranged input data, and as shown in FIG. 3, frequency-domain output data obtained as a result of the operation is properly ordered.

However, in general FFT-processing, as the transition of data arrangement is complicated, data transfer between a register of a DSP and a memory must be performed in 1-word units.

FIG. 4 is an example of the FFT-processing according to the present invention.

FIG. 5 is an explanatory diagram showing a butterfly operation having a radix of 4.

FIG. 6 is an explanatory diagram showing the transition of data arrangement in the FFT-processing according to the present invention.

As shown in FIG. 4, the operation in the FFT-processing is replacing bits in the time domain with bits in the frequency domain by the butterfly operation in FIG. 5.

As a characteristic feature of processing by the DSP, in comparison with data transfer between the memory and the register of the DSP in 1-word units, the entire processing time can be greatly shortened by performing data transfer in 4-word units as the unit of butterfly operation.

In the FFT-processing having the radix 4, a 3-stage butterfly operation is performed on 64 data stored in 64 storage regions.

The 64 storage regions are used by 4 regions each including 16 regions, and each of 4 results of the first and second stages of butterfly operation is stored every 4th storage region in each of the 4 regions.

Further, in the result of the final (third) stage in this example) butterfly operation, the data is rearranged except for the LSB.

That is, in the result of the final (third) stage butterfly operation, bits are arranged without the least significant bit.

In this manner, as the result of the butterfly operation is rearranged, bit reverse processing in the FFT/IFFT-processing can be omitted, and further, in the butterfly operation, as data transfer between the memory and the DSP is performed not in 1-word units but in 4-word units, the time necessary for the FFT/IFFT-processing can be greatly reduced (to a part of the initial time).

Note that in a case where the faster FFT/IFFT-processing according to the present invention is applied to FFT-processing with a radix of 2, the storage region is divided into 2 regions, and each of the results of 2 butterfly operations is stored in every second storage region in each of the 2 storage regions.

Further, in a case where the faster FFT/IFFT-processing according to the present invention is applied to FFT-processing with a radix of 8, the storage region is divided into 8 regions, and each of results of 8 butterfly operations is stored in every eighth storage region in each of the 8 storage regions.

More particularly, prior to the 3-stage butterfly operation in the FFT-processing with a radix of 4, each of 64 input data pieces D(0) to D(63) as the subjects of processing is stored in 64 storage regions M(0) to M(63) in the order shown in the following expression 3.

$$D(I) \rightarrow R(M^{N-1}([I/M^{\circ}]\mathrm{mod}M)+M^{N-2}([I/M^{1}]\mathrm{mod}M)+\ldots+M^{\circ}([I/M^{N-1}]\mathrm{mod}M) \quad \text{(Expression 3)}$$

Note that N=1, 2, 3 . . . , and in the case of FFT with the radix of 4, M=4, I=0 to $M^{N-1}$ hold. [X] is an integer not exceeding X, YmodZ, a residue system of integer Y for integer Z (the same shall apply hereinafter).

Further, the respectively 4 results of the first and second stages of butterfly operation in the FFT-processing with the radix of 4, R(0) to R(3), . . . , R(60) to R(63), are stored in the 64 memory regions 0 to 63 in the order as shown in the following expression 4.

$$B(MJ+H) \rightarrow R(M^{N-1}H+H^{N-2}([J/M^{1}]\mathrm{mod}M)+\ldots+M^{\circ}([J/M^{N-1}]\mathrm{mod}M)) \quad \text{(Expression 4)}$$

Note that in the case of FFT with the radix of 4, J=0 to $M^{N-1}-1$ and H=0 to 3 hold (the same shall apply hereinafter).

Further, the respectively 4 results of the final (third) stage butterfly operation in the FFT-processing with the radix of 4, R(0) to R(3), . . . , R(60) to R(63), are stored in the 64 memory regions R(0) to R(63) in the order as shown in the following expression 5.

$$B(MJ+H) \rightarrow R(M^{N-1}([J/M^{1}]\mathrm{mod}M)+\ldots+M([J/M^{N-1}]\mathrm{mod}M)+\mathrm{H}) \quad \text{(Expression 5)}$$

Further, prior to the 3-stage butterfly operation in the IFFT-processing with the radix of 4, respective 64 input data pieces D(0) to D(63) as the subjects of processing are rearranged in the order as shown in the following expression 6, and stored in the 64 storage regions R(0) to R(63).

Note that in the embodiment to be described below, as the order of arrangement of the result of FFT is corresponding to that of data to be subjected to the IFFT-processing, the rearrangement is not performed.

That is, in the case of processing as shown in the above expression 5, processing as shown in the following expression 6 is omitted.

$$D(I) \rightarrow R(M^{N-1}([I/M^{\circ}]\mathrm{mod}M)+\mathrm{M}^{N-2}([I/M^{1}]\mathrm{mod}M)+\ldots+M^{\circ}([I/M^{N-1}]\mathrm{mod}M)) \quad \text{(Expression 6)}$$

Further, respectively 4 results of the first to final (third) stage butterfly operation in the IFFT-processing with the radix of 4, B(0) to B(3), . . . , B(60) to B(63), are stored in the 64 memory regions 0 to 63 in the order as shown in the following expression 7.

$$D(NJ+H) \rightarrow R(M^{N-1}H+M^{N-2}([J/M^{1}]\mathrm{mod}M)+\ldots M^{\circ}([J/M^{N-1}]\mathrm{mod}M)) \quad \text{(Expression 7)}$$

[Embodiment]

Hereinbelow, inverse-spread processing using FFT/IFFT and faster FFT/IFFT will be described.

FIG. 7 is a block diagram showing the hardware and hardware construction of a base station 2 in FIG. 1.

As shown in FIG. 7, the base station 2 of the mobile communication system 1 (FIG. 1) includes a reception unit 20 and a transmission unit 210.

The reception unit 20 has a reception circuit 200, an analog/digital converter (A/D) 202, a delay profile detection unit 22, and a data decoding unit 250.

FIG. 8 is a block diagram showing a hardware construction of the reception unit 20 in FIG. 7.

Note that the delay profile detection 22 (FIG. 2) is realized as software which is stored in a ROM 264 of a DSP circuit 26 (FIG. 3) of the reception unit 20, and which is executed by a DSP 262.

Further, the reception circuit 200 (FIG. 7), the A/D 202 and the data decoding unit 250 are appropriately realized by specialized hardware and software executed by the DSP circuit 26 (FIG. 8), or any of them.

The delay profile detection unit 22 has a first fast Fourier transform (FFT) unit 3-1, an inverse fast Fourier transform (IFFT) unit 4, a multiplication unit 220, and a code generation unit 24.

The code generation unit 24 may be realized by simply storing the result of FFT obtained by FFT-processing of RACH preamble code into the ROM 264 or the RAM 266. However, in the following description, the code generation unit 24 includes an RACH code storage unit 240 and a second FFT unit 3-2.

The respective constituent elements of the delay profile detection unit 22 are generated as, e.g., respectively independent software modules. They are appropriately added or deleted in accordance with necessity, and started at an arbitrary timing by an OS (not shown) or the like.

[Transmission Unit 210]

The transmission unit 210 (FIG. 7) transmits transmission data supplied from the network 10 (FIG. 1), or the like.

[Reception Circuit 200]

The reception circuit 200 (FIGS. 7 and 8) receives a signal from the mobile station 12, demodulates the signal to a baseband signal, and outputs the signal to the A/D 202.

[A/D 202]

The A/D 202 converts the analog baseband signal input from the reception circuit 200 into digital received data, and outputs the data to the FFT unit 3-1 of the delay profile detection unit 22 and the data decoding unit 250.

[Data Decoding Unit 250]

The data decoding unit 250 decodes the received data by using a delay profile input from the delay profile detection unit 22, and outputs the data as decoded data to the network 10 (FIG. 1), or the like.

[Delay Profile Detection Unit 22]

The delay profile detection unit 22 performs inverse-spread processing on an RACH preamble included in the received data input from the A/D 202 by using the FFT/IFFT-processing as described in FIGS. 2 to 6, thus generates a delay profile, and outputs the delay profile to the data decoding unit 250.

Hereinbelow, the respective constituent elements of the delay profile detection unit 22 will be described.

[FFT Unit 3-1]

FIG. 9 is an explanatory diagram showing the transition of data arrangement in processing by the first FFT unit 3-1 in FIG. 7.

The first FFT unit 3-1 sequentially performs a 3-stage butterfly operation with a radix of 4 on 64-point received data input from the A/D 202 thereby performs the FFT-processing, and outputs an FFT result A, obtained as the result of the FFT-processing, to the multiplication unit 220.

Hereinbelow, the processing by the FFT unit 3-1 at each stage will be described in detail.

[Storage of Received Data]

In the delay profile detection unit 22, the FFT unit 3-1 stores the 64-point received data D (I; I=0 to 63) input from the A/D 202 into 64 continuous storage regions R(I'; I'=0 to 63) of the RAM 266 (FIG. 8), in the order as described with reference to the expression 3.

That is, the FFT unit 3-1 stores the respective received data D(0) to D(63) into the storage regions R(0), R(16), R(32), R(48), . . . R(63), as shown in the left end column #1 in FIG. 9.

By this received data storage processing, the order of the received data D(I) is “twisted” as shown in the left end of FIG. 9.

Hereinbelow, for the sake of concretization and clarification of explanation, an example in which each of data processed by the FFT unit 3-1 is 1 word for the DSP 262 will be described.

[First-Stage Butterfly Operation]

As shown between the left end column #1 and the second column #2 in FIG. 9, the FFT unit 3-1 reads the 16×4 received data pieces [D(0), D(16), D(32), D(48)], [D(4), D(20), D(36), D(52)], . . . , [D(15), D(31), D(47), D(63)], stored in the 16×4 continuous storage regions R(0) to R(3), R(4) to R(7), . . . R(60) to R(63) of the RAM 266, in 4-word units, at a time.

Further, as shown between the left end column #1 to the second column #2 in FIG. 9, the FFT unit 3-1 performs the first-stage butterfly operation as shown in FIG. 5 on the read 16×4 received data pieces [D(0), D(16), D(32), D(48)], [D(4), D(20), D(36), D(52)], . . . , [D(15), D(31), D(47), D(63)] and obtains 16×4 operation results [B(0) to B(3)], [B(4) to B(7)], . . . , [B(60) to B(63)].

Further, the FFT unit 3-1 stores the 16×4 operation results [B(0) to B(3)], [B(4) to B(7)], . . . , [B(60) to B(63)] into 64 storage regions R'(0) to R'(63) of the RAM 266 in the order described above with reference to expression 4.

That is, as shown between the left end column #1 and the second column #2 in FIG. 9, the FFT unit 3-1 stores the 16×4 operation results [B(0) to B(3)], [B(4) to B(7)], . . . , [B(60) to B(63)] into the storage regions [R'(0), R'(16), R'(32), R'(48)], [R'(4), R'(20), R'(36), R'(52)], . . . , [R'(15), R'(31), R'(47), R'(63)].

[Second-Stage Butterfly Operation]

As shown between the second column #2 and the third column #3 in FIG. 9, the FFT unit 3-1 reads the 16×4 butterfly operation results [B(0), B(16), B(32), B(48)], [B(4), B(20), B(36), B(52)], . . . , [B(15), B(31), B(47), B(63)], stored in the 16×4 continuous storage regions of the RAM 266, R'(0)to R'(3), R'(4) to R'(7), . . . , R'(60) to R'(63), in 4-word units, at a time.

Further, as shown between the second column #2 and the third column #3 in FIG. 9, the FFT unit 3-1 performs the second-stage butterfly operation as shown in FIG. 5 on the read 16×4 butterfly operation results [B(0), B(16), B(32), B(48)], [B(4), B(20), B(36), B(52)], . . . , [B(15), B(31), B(47) B(63)], and obtains the 16×4 operation results [B'(0) to B'(3)], [B'(4) to B'(7)], . . . , [B'(60) to B'(63)].

Further, the FFT unit 3-1 stores the 16×4 operation results [B'(0) to B'(3)], [B'(4) to B'(7)], . . . , [B'(60) to B'(63)] into 64 storage regions R"(0) to R"(63) of the RAM 266 in the order described above with reference to expression 4.

That is, as shown between the second column #2 and the third column #3 in FIG. 9, the FFT unit 3-1 stores the 16×4 operation results [B'(0) to B'(3)], [B'(4) to B'(7)], . . . , [B'(60) to B'(63)] into the storage regions [R"(0), R"(16), R"(32), R"(48)], [R"(4), R"(20), R"(36), R"(52)], . . . , [R"(R15), R"(31), R"(47), R"(63)].

[Final (Third)-Stage Butterfly Operation]

As shown between the third column #3 and the fourth column #4 in FIG. 9, the FFT unit 3-1 reads the 16×4 butterfly operation results [B'(0), B'(16), B'(32), B'(48)], [B'(4), B'(20), B'(36), B'(52)], . . . , [B'(15), B'(31), B'(47), B'(63)], stored in the 16×4 continuous storage regions of the RAM 266, R"(0) to R"(3), R–(4) to R"(7), . . . , R"(60) to R"(63), in 4-word units, at a time.

Further, as shown between the third column #3 and the fourth column #4 in FIG. 9, the FFT unit 3-1 performs the final (third)-stage butterfly operation as shown in FIG. 5 on the read 16×4 butterfly operation results [B'(0), B'(16), B'(32), B'(48)], [B'(4), B'(20), B'(36), B'(52)], . . . , [B'(15), B'(31), B'(47), B'(63)], and obtains 16×4 operation results [B"(0) to B"(3)], [B"(4) to B"(7)], . . . [B"(60) to B"(63)].

Further, the FFT unit 3-1 stores the 16×4 operation results [B"(0) to B"(3)], [B"(4) to B"(7)], . . . , [B"(60) to B"(63)] into the 64 storage regions R'"(0) to R'"(63) of the RAM 266 in the order described above with reference to expression 5.

That is, as shown between the third column #3 and the fourth column #4 in FIG. 9, the FFT unit 3-1 stores the 16×4 operation results [B"(0) to B"(3)], [B"(4) to B"(7)], . . . , [B"(60) to B"(63)] into the storage regions [R'"(0) to R'"(3)], [R'"(16) to R'"(20)], . . . , R'"(60) to R'"(63)].

In this manner, only the results of the final (third)-stage butterfly operation are stored into the RAM 266 in an order different from that of the first stage and the second stage since the order of arrangement of FFT results outputted from the FFT unit 3-1 are applied to the order of arrangement as input data to the IFFT unit 4.

Further, the first to third (final) stages of butterfly operation processing (FIG. 9) by the first FFT unit 3-1 (FIG. 7) will be described with reference to FIG. 10.

FIG. 10 is a flowchart showing the first to third (final) stage butterfly operation processing (S10) by the first FFT unit 3-1 (FIG. 7).

As shown in FIG. 10, when the storage of received data as shown in the left end column #1 has been completed, at step S100-1, the FFT unit 3-1 performs the first stage butterfly operation.

At step S102, the DSP 262 (FIG. 8), which is performing the processing of the FFT unit 3-1 (FIG. 7), transfers the received data D(I) stored in the continuous 4-word storage regions of the RAM 266 to the register in 4-word units.

At step S104, the DSP 262 performs the butterfly operation as shown in FIG. 5.

At step S106, the DSP 262 transfers the results of the butterfly operation from the register to the storage regions of the RAM 266 in 4-word units as shown between the left end column #1 and the second column #2 in FIG. 9.

The 4-word-unit transfer is realized by simultaneously performing plural butterfly operations or previously stocking the operation results in the register of the DSP 262.

At step S108, the DSP 262 determines whether or not the processing at steps S102 to S106 on all the points of the received data has been completed. If the processing has been completed, the process proceeds to the next stage butterfly operation processing, otherwise it returns to step S102.

At step S100-2, the DSP 262 performs the second stage butterfly operation as in the case of the processing at step S100-1.

At step S100-3, the DSP 262 performs the final (third) stage butterfly operation.

At step S112, the DSP 262 (FIG. 8) transfers the result of the second stage butterfly operation, B', in 4-word units, to the register, as in the case of the processing at step S102.

At step S114, the DSP 262 performs the butterfly operation as shown in FIG. 5 as in the case of the processing at step S104.

At step S116, as shown between the third column #3 and the fourth column #4 in FIG. 9, the DSP 262 transfers the results of the butterfly operation, in 4-word units, from the register to the storage regions of the RAM 266, as described above with reference to expression 5.

At step S118, the DSP 262 determines whether or not the processing on all the points of received data at steps S102 to S106 has been completed, as in the case of the processing at step S108. If the processing has been completed, the process ends, otherwise it returns to step S112.

[Code Generation Unit 24]

In the code generation unit 24, the RACH code storage unit 240 holds the RACH preamble code, and outputs it to the FFT 3-2.

The FFT 3-2 performs the FFT-processing on the RACH preamble code input from the RACH code storage unit 240, and outputs the processed code as the FFT result B to the multiplication unit 220.

[Multiplication Unit 220]

The multiplication unit 220 multiplies the FFT result A input from the FFT unit 3-1 by the FFT result B input from the code generation unit 24, and outputs the result of multiplication to the IFFT unit 4.

That is, the multiplication unit 220 realizes the above-described convolution as described above with reference to expression 2 by multiplying the FFT result A by the FFT result B.

[IFFT Unit 4]

FIG. 11 is an explanatory diagram showing the transition of data arrangement in the processing by the first IFFT unit 4 in FIG. 7.

The first IFFT unit 4 sequentially performs a 3-stage butterfly operation with a radix of 4 on the 64-point multiplication result input from the multiplication unit 220, thereby performs the IFFT-processing, and outputs a delay profile obtained as the result of the IFFT-processing to the data decoding unit 250.

Hereinbelow, the processing by the IFFT 4 at each stage will be described in detail.

The order of arrangement of the FFT result A and the FFT result B(the fourth (right end) column #4 in FIG. 9) outputted by the FFT units 3-1 and 3-2 (FIG. 7) is the same as that of the data input into the IFFT unit 4 (left end column #1 in FIG. 11).

Accordingly, in the delay profile detection unit 22, the data rearrangement processing in the IFFT unit 4 as described above with reference to expression 6 is substituted with processing by the FFT units 3-1 and 3-2 at step S116 (FIG. 10).

Accordingly, in the IFFT unit 4, the data rearrangement as in the processing by the FFT units 3-1 and 3-2 is not required.

[First-Stage Butterfly Operation]

As shown between the left end column #1 and the second column #2 in FIG. 11, the IFFT unit 4 reads the 16×4 multiplication result data pieces [P(0), P(16), P(32), P(48)], [P(4), P(20), P(36), P(52)], . . . , [P(15), P(31), P(47), P(63)], input from the multiplication unit 220, in 4-word units, at a time.

Further, as shown between the left end column #1 and the second column #2 in FIG. 11, the IFFT unit 4 performs the first-stage butterfly operation as shown in FIG. 5 on the read 16×4 received data [P(0), P(16), P(32), P(48)], [D(4), P(20), P(36), P(52)], . . . , [P(15), P(31), P(47), P(63)], and obtains 16×4 operation results [B(0) to B(3)], [B(4) to B(7)], . . . , [B(60) to B(63)].

Further, the IFFT unit 4 stores the 16×4 operation results [B(0) to B(3)], [B(4) to B(7)], . . . , [B(60) to B(63)] into 64 storage regions R'(0) to R'(63) of the RAM 266 in the order described above with reference to expression 7.

That is, as shown between the left end column #1 and the second column #2 in FIG. 11, the IFFT unit 4 stores the 16×4 operation results [B(0) to B(3)], [B(4) to B(7)], . . . , [B(60) to B(63)] into the storage regions [R'(0), R'(16), R'(32), R'(48)], [R'(4), R'(20), R'(36), R'(52)], . . . , [R'(15), R'(31), R'(47), R'(63)]

[Second Stage Butterfly Operation]

As shown between the second column #2 and the third column #3 in FIG. 11, the IFFT unit 4 reads the 16×4 butterfly operation results [B(0), B(16), B(32), B(48)], [B(4), B(20), B(36), B(52)], . . . , [B(15), B(31), B(47), B(63)], stored in the 16×4 continuous storage regions of the RAM 266, R'(0) to R'(3), R'(4) to R'(7), . . . , R'(60) to R'(63), in 4-word units, at a time.

Further, as shown between the second column #2 and the third column #3 in FIG. 11, the IFFT unit 4 performs the second-stage butterfly operation as shown in FIG. 5 on the read 16×4 butterfly operation results [B(0), B(16), B(32), B(48)], [B(4), B(20), B(36), B(52)], . . . , [B(15), B(31), B(47), B(63)], and obtains 16×4 operation results [B'(0) to B'(3)], [B'(4) to B'(7)], . . . , [B'(60) to B'(63)].

Further, the IFFT unit 4 stores the 16×4 operation results [B'(0) to B'(3)], [B'(4) to B'(7)], . . . , [B'(60) to B'(63)] into 64 storage regions R"(0) to R"(63) of the RAM 266 in the order described above with reference to expression 7.

That is, as shown between the second column #2 and the third column #3 in FIG. 11, the IFFT unit 4 stores the 16×4 operation results [B'(0) to B'(3)], [B'(4) to B'(7)], . . . , [B'(60) to B'(63)] into the storage regions [R"(0), R"(16), R"(32), R"(48)], [R"(4), R"(20), R"(36), R"(52)], . . . , [R"(15), R"(31), R"(47), R"(63)].

[Final (Third) Stage Butterfly Operation]

As shown between the third column #3 and the fourth column #4 in FIG. 11, the IFFT unit 4 reads the 16×4 butterfly operation results [B'(0), B'(16), B'(32), B'(48)], [B'(4), B'(20), B'(36), B'(52)], . . . , [B'(15), B'(31), B'(47), B'(63)], stored in the 16×4 continuous storage regions of the RAM 266, R"(0) to R"(3), R"(4) to R"(7), . . . , R"(60) to R"(63), in 4-word units, at a time.

Further, as shown between the third column #3 and the fourth column #4 in FIG. 11, the IFFT unit 4 performs the final (third)-stage butterfly operation as shown in FIG. 5 on the read 16×4 butterfly operation results [B'(0), B'(16), B'(32), B'(48)], [B'(4), B'(20), B'(36), B'(52)], . . . , [B'(15), B'(31), B'(47), B'(63)], and obtains 16×4 operation results [B"(0) to B"(3)], [B"(4) to B"(7)], . . . , [B"(60) to B"(63)].

Further, the IFFT unit 4 stores the 16×4 operation results [B"(0) to B"(3)], [B"(4) to B"(7)], . . . , [B"(60) to B"(63)] into 64 storage regions R'"(0) to R'"(63) of the RAM 266 in the order described above with reference to expression 7.

That is, as shown between the third column #3 and the fourth column #4 in FIG. 11, the IFFT unit 4 stores the 16×4 operation results [B"(0) to B"(3)], [B"(4) to B"(7)], . . . , [B"(60) to B"(63)] into the storage regions [R'"(0), R'"(16), R'"(32), R'"(48)], [R'"(4), R'"(20), R'"(36), R'"(52)], . . . , [R'"(15), R'"(31), R'"(47), R'"(63)].

Unlike the processing by the FFT units 3-1 and 3-2, in the processing by the IFFT unit 4, the results of the final (third) stage butterfly operation are rearranged as in the case of the first and second stage operations, since a delay profile obtained as the result of IFFT becomes in proper order as shown in the fourth column #4 (right end) in FIG. 11.

Further, the first to third (final) stage butterfly operation processing (FIG. 11) by the first IFFT unit 4 (FIG. 7) will be described with reference to FIG. 12.

FIG. 12 is a flowchart showing the first to third (final) stage butterfly operation processing by the first IFFT unit 4 (FIG. 7).

As shown in FIG. 12, when storage of received data as shown in the left end column #1 in FIG. 11 has been completed, the IFFT unit 4 performs the first stage butterfly operation at step S120-1, as in the case of the processing at step S100-1 (FIG. 10).

At step S122, as in the case of the processing at step S102, the DSP 262 (FIG. 8), which is performing the processing of the IFFT unit 4 (FIG. 7), transfers the received data D(I) stored in the continuous 4-word storage regions of the RAM 266 to the register in 4-word units.

At step S124, as in the case of the processing at step S104, the DSP 262 performs the butterfly operation as shown in FIG. 5.

At step S126, as in the case of the processing at step S106, the DSP 262 transfers the results of the butterfly operation from the register to the storage regions of the RAM 266 in 4-word units as shown between the left end column #1 and the second column #2 in FIG. 11.

The 4-word unit transfer is realized in the same manner as that in the processing at step S106.

At step S128, as in the case of the processing at step S108, the DSP 262 determines whether or not the processing at steps S122 to S126 on all the points of the received data has been completed. If the processing has been completed, the process proceeds to the next stage butterfly operation processing. Otherwise it returns to step S122.

At step S120-2, as in the case of the processing at step S120-1, the DSP 262 performs the second stage butterfly operation processing.

At step S120-3, as in the case of the processing at step S120-1, the DSP 262 performs the third (final) stage butterfly operation processing.

[Entire Operation]

Hereinbelow, the entire operation of the reception unit 20 of the base station 2 (FIGS. 1, 7 and 8) will be described.

The reception circuit 200 of the reception unit 20 (FIGS. 7 and 8) of the base station 2 receives the RACH preamble from the mobile station 12 (FIG. 1), and outputs the signal as a baseband signal to the A/D 202. The A/D 202 converts the baseband signal to digital received data and outputs the data to the delay profile detection unit 22.

In the delay profile detection unit 22, the FFT unit 3-1 FFT-processes the received data, and outputs the data as the FFT result A to the multiplication unit 220.

In the code generation unit 24, the RACH code storage unit 240 outputs the stored RACH preamble code to the FFT unit 3-2. The FFT unit 3-2 FFT-processes the RACH preamble code, and outputs the code as the FFT result B to the multiplication unit 220.

The multiplication unit 220 multiplies the FFT result A input from the FFT unit 3-1 by the FFT result B input from the FFT unit 3-2 of the code generation unit 24, and outputs the result of multiplication to the IFFT unit 4.

The IFFT unit 4 IFFT-processes the result of multiplication input from the multiplication unit 220, and outputs the data as the delay profile to the data decoding unit 250.

The data decoding unit 250 decodes the received data input from the A/D 202 by using the delay profile input from the IFFT unit 4, and outputs the data as decoded data to the network 10 (FIG. 1) or the like.

As described above, the present invention provides the following:

(1) A correlation detection apparatus for detecting a first signal in a time domain including predetermined code, and a correlation between the first signal and the predetermined code, comprising: transform means for transforming the first signal in the time domain into a frequency domain; correlation-signal generation means for generating a correlation signal indicating a correlation between the predetermined code transformed to the frequency domain and the first signal transformed to the frequency domain; and correlation detection means for inverse-transforming the generated correlation signal into a signal in the time domain and detecting the correlation between the first signal and the predetermined code.

(2) Further, in the correlation detection apparatus, wherein the transform means transforms the first signal into the frequency domain by performing Fourier transform processing on the first signal in the time domain, the correlation-signal generation means generates the correlation signal by multiplying the predetermined code transformed to the frequency domain by the first signal transformed to the frequency domain, and the correlation detection means detects the correlation between the first signal and the predetermined code by performing inverse Fourier transform on the generated correlation signal.

(3) The first signal is a CDMA signal, and the predetermined code is a preamble. The conversion means performs Fourier transform processing on the CDMA signal, thereby performs FFT operation of the CDMA signal.

The correlation signal generation means multiplies the result of the FFT operation of the CDMA signal by the result of the FFT operation of the preamble obtained by the Fourier transform processing on the preamble, thereby generates the correlation signal.

The correlation detection means performs inverse Fourier transform on the generated correlation signal and generates the delay profile, thereby detects the correlation between the CDMA signal and the preamble.

(4) Further, the present invention provides a Fourier transform apparatus for performing Fourier transform by performing an N-stage butterfly operation on $M^N$ time-series data by using $M^N$ (M is a radix in Fourier transform; N=1, 2, . . . ) continuous storage regions, comprising: data storage means for storing (I; I=0, 1 . . . , $M^N-1$)th data into ($M^{N-1}$([I/M°]modM)+$M^{N-2}$([I/$M^1$]modM)+ . . . +M°([I/$M^{-1}$]modM); [X] is an integer not exceeding X; YmodZ is a residue system of integer Y for integer Z)th storage region; first butterfly-operation processing means for repeating processing of storing respective (MJ+H)th M pieces of data, obtained by performing a (J)th butterfly operation on data stored in (MJ+H; J=0, 1, . . . , $M^{N-1}-1$, H=0 to M−1)th M storage regions, into ($M^{N-1}$H+$M^{N-2}$([J/$M^1$]modM)+ . . . +M°([J/$M^{N-1}$])modM))th M storage regions, (N−1) times; and second butterfly-operation processing means for performing processing of storing respective (MJ+H)th M pieces of data, obtained by performing a butterfly operation on the data obtained as a result of the (N−1)th butterfly operation and stored in the (MJ+H)th M storage regions, into ($M^{N-1}$([J/$M^1$]modM)+ . . . +sM°([J/$M^{N-1}$]modM)+H)th M storage regions.

(5) The Fourier transform apparatus performs the Fourier transform by performing a 3-stage butterfly operation on 64 pieces of time-series data by using 64 (N=3) continuous storage regions.

The data storage means stores the (I; I=0 to 63)th data into the (16(Imod4)+4([I/4]mod4)+([I/16]mod4))th storage regions.

The first butterfly-operation processing means repeats the processing of storing the respective (4J+H)th four pieces of data, obtained by the (J)th butterfly operation on the data stored in the four (4J+H; J=0 to 15, H=0 to 3)th storage regions, into the four (16H+4([J/4]mod4)+([J/16]mod4))th storage regions, twice.

The second butterfly-operation processing means stores the respective (4J+H)th four pieces of data, obtained by the butterfly operation on the data stored in the four (4J+H)th storage regions as the result of the two butterfly operations, into the four (16([J/4]mod4)+4([J/16]mod4)+H)th storage regions.

(6) Further, the present invention provides an inverse Fourier transform apparatus for performing inverse Fourier transform by performing an N-stage butterfly operation on $M^N$ pieces of time-series data by using $M^N$ (M is a radix in inverse Fourier transform; N=1, 2, . . . ) continuous storage regions, comprising: third butterfly-operation processing means for repeating processing of storing respective (MJ+H)th M pieces of data, obtained by performing a (J)th butterfly operation on data stored in (MJ+H; J=0, 1, . . . , $M^{N-1}$1, H=0, 1, . . . , M−1)th M storage regions, into ($M^{N-1}$H+$M^{N-2}$([J/$M^1$]modM)+ . . . +Mo([J/$M^{N-1}$]modM))th M storage regions, (N) times.

(7) The inverse Fourier transform apparatus performs the inverse Fourier transform by performing a 3-stage butterfly operation on 64 pieces of time-series data by using 64 (M=4, N=3) continuous storage regions.

The third butterfly operation processing means repeats the processing of storing the respective (4J+H)th four pieces of data, obtained by the (J)th butterfly operation on the data stored in the four (4J+H; J=0 to 15, H=0 to 3)th storage regions, into the four (16H+4([J/4]mod4)+([J/16]mod4))th storage regions, 3 times.

As described above, the Fourier transform apparatus used in the correlation detection apparatus according to the present invention realizes software CDMA inverse-spread processing.

What is claimed is:

1. A correlation detection apparatus for detecting a first signal in a time domain including predetermined code, and a correlation between the first signal and the predetermined code, comprising:

transform means for performing a Fourier transform comprising an N-stage butterfly operation by using $M^N$ (M is a radix in the Fourier transform; N=1, 2, . . . ) continuous storage regions on the first signal comprising $M^N$ time-series data;

wherein the transform means comprises:

data storage means for storing (I; I=0, 1, . . . , $M^N-1$)th data into ($M^{N-1}$([I/$M^0$]modM) +$M^{N-2}$([I/$M^1$]modM) + . . . +M°([I/$M^{N-1}$]modM); [X] is an integer not exceeding X; Y modZ is residue system of integer Y for integer Z)th storage region;

first butterfly operation processing means for repeating processing of storing respective (MJ+H)th M pieces of data, obtained by performing a (J)th butterfly operation on data stored in (MJ+H; J=0, 1, . . . , $M^{N-1}$,H=0 to M−1)th M storage regions, into ($M^{N-1}$H+$M^{N-2}$([J/$M^1$]modM) + . . . +M°([J/$M^{N-1}$]modM))th M storage regions, (N−1) times; and second butterfly operation processing means for performing processing of strong respective (MJ+H)th M pieces of data, obtained by performing a butterfly operation on the fata obtained as a result of the (N−1)th butterfly operation and stored in the (MJ+H)th M storage regions, into ($M^{N-1}$([J/$M^1$]modM) + . . . +sM°([J/$M^{N-1}$]modM)+H)th M storage regions;

correlation-signal generation means for generating a correlation signal indicating a correlation between the predetermined code transformed to the frequency domain and the first signal transformed to the frequency domain; and correlation detection means for inverse-transforming the generated correlation signal into a signal in the time domain and detecting the correlation between the first signal and the predetermined code.

2. A correlation detection apparatus comprising:

transform means for transforming a first signal into the frequency domain by performing Fourier transform processing on the first signal in the time domain, correlation-signal generation means for generating a correlation signal by multiplying a predetermined code on which a Fourier transform is performed by the first signal on which the Fourier transform is performed;

correlation detection means for detecting a correlation between the first signal and the predetermined code by performing inverse Fourier transform comprising an N-Stage butterfly operation by using $M^N$ (M is a radix in inverse Fourier transform; N=1, 2, . . . ) continuous storage regions on the generated correlation signal comprising $M^N$ pieces of time-series data; and butterfly operation processing means for repeating processing of storing respective (MJ+H)th M pieces of data, obtained by performing a (J)th butterfly operation on data stored in (MJ+H; J=0, 1, . . . , $M^{N-1}-1$; H=0, 1, . . . , M−1)th M storage regions, into ($M^{N-1}$ H+$M^{N-2}$ ([J/$M^1$])modM)+ . . . +M°([J/$M^{N-1}$]modM))th M storage regions, (N) times.

* * * * *